Dec. 5, 1967  C. VAN DER LELY  3,356,162
HARROWS
Original Filed June 1, 1965  2 Sheets-Sheet 1
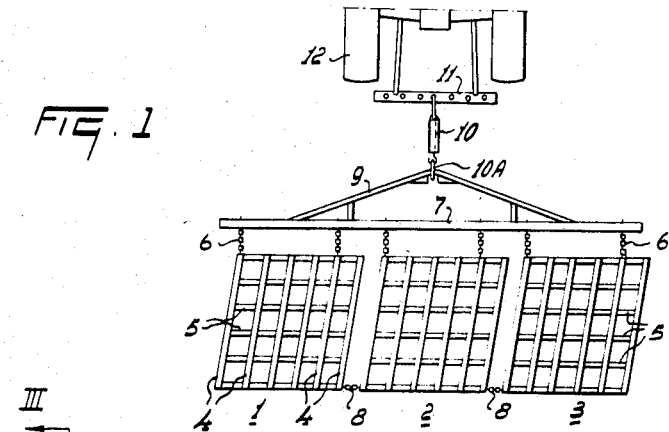
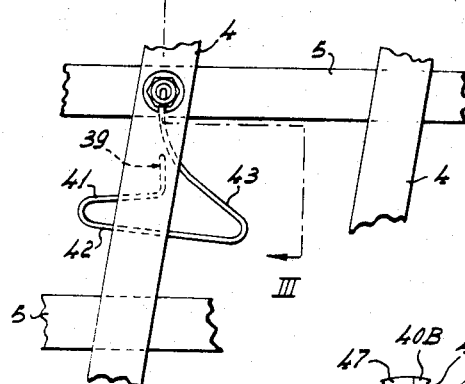
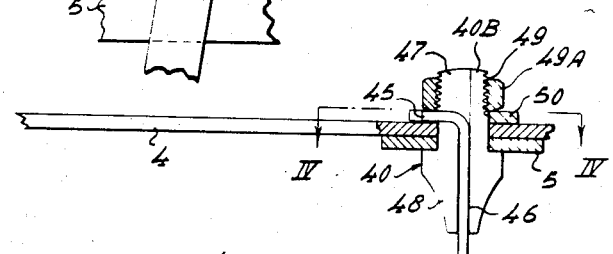
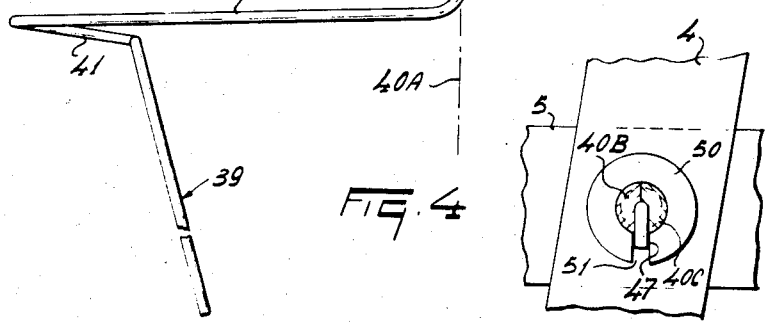
INVENTOR.
CORNELIS VAN DER LELY
BY
Mason, Mason & Albright
Attorneys Dec. 5, 1967  C. VAN DER LELY  3,356,162
HARROWS Original Filed June 1, 1965

INVENTOR.
CORNELIS VAN DER LELY
BY
Mason, Mason & Albright
Attorneys

United States Patent Office 3,356,162
Patented Dec. 5, 1967

3,356,162
HARROWS
Cornelis van der Lely, Zug, Switzerland, assignor to C. van der Lely N. V., Maasland, Netherlands, a Dutch limited-liability company
Continuation of application Ser. No. 460,412, June 1, 1965. This application Oct. 17, 1966, Ser. No. 587,339
5 Claims. (Cl. 172—643)

ABSTRACT OF THE DISCLOSURE

This invention is a harrow having at least one tine which includes a ground working portion, a connecting portion and a resilient portion. The arrangement of these portions of the tine provides for the resilient portion to be connected with the harrow's frame so that the tine resiliently deflects to avoid obstacles without becoming deformed. At least part of the connecting portion extends substantially horizontally, whereas the resilient portion extends substantially vertically. The connecting portion and the ground working portion are both generally straight throughout the greater parts of their lengths and are disposed substantially perpendicular to one another.

---

This application is a continuation of application Ser. No. 460,412, now abandoned and which is a continuation-in-part of application Ser. No. 96,159, filed Mar. 16, 1961.

This invention relates to harrows, cultivators and like agricultural implements (hereinafter referred to as harrows) of the kind having a plurality of tines which, during use of the harrow, are adapted to penetrate into the ground and to be dragged through it by a tractor or other draft means so as to break up or otherwise "work" the soil.

It is an object of the invention to provide harrows in which, during operation thereof, the tines are arranged to deflect to avoid obstacles in their path of movement without becoming permanently deformed to any substantial extent and to improve the working of the soil.

According to the present invention there is provided a harrow of the kind set forth, wherein each tine is connected to a harrow-frame so as to be turnable or distortable at least to some extent about a corresponding non-horizontal axis, the arrangement being such that a movement of any tine about its corresponding axis results in a displacement of at least a ground-working portion of the tine relative to the harrow frame. The tine also includes a connecting portion and a resilient element, with the connecting portion joining the ground-working portion to a resilient element. The ground-working portion is located to the rear of the junction of the connecting portion and the resilient element with respect to the direction of travel. The resilient element is included in the portion of the tine which is connected to the frame.

Figure 5:
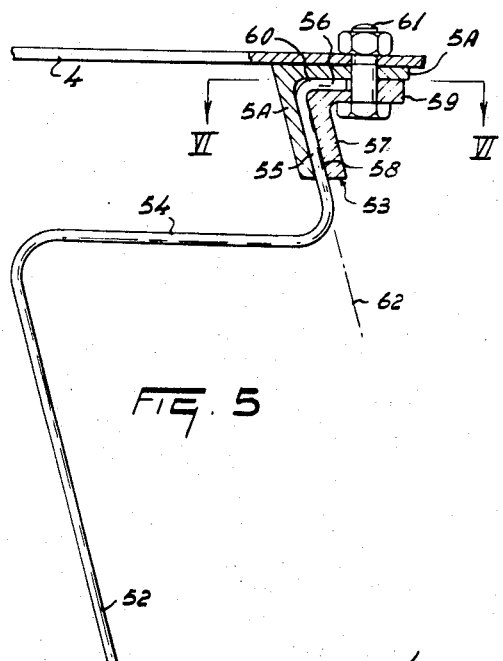
Figure 6:
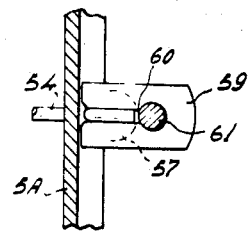
Figure 8:
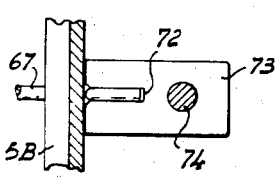
Figure 7:
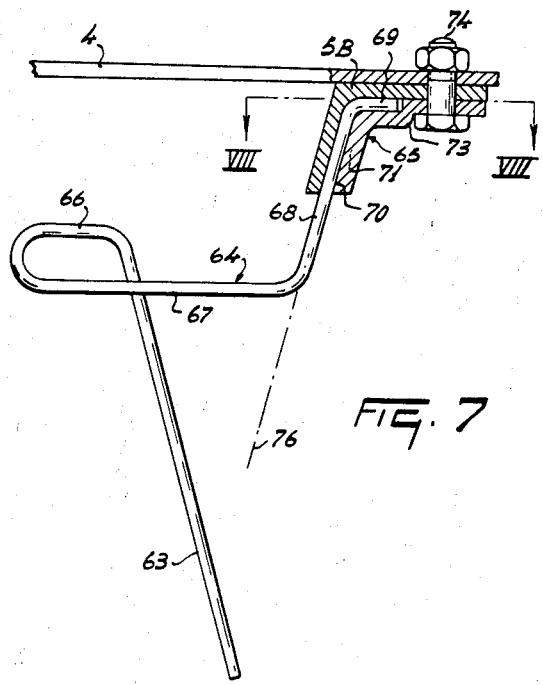

For a better understanding of the invention and to show how the same may be carried into effect, reference will now be made, by way of example, to the accompanying drawings, in which:

FIGURE 1 is a plan view of a harrow in accordance with the invention coupled to the rear of a tractor, FIGURE 2 is a plan view, to an enlarged scale, of part of the harrow shown in FIGURE 1, FIGURE 3 is a section, to an enlarged scale, on the line III—III of FIGURE 2, FIGURE 4 is a sectional view along the lines IV—IV of FIGURE 3, FIGURE 5 is a sectional elevation, to an enlarged scale, of an alternative embodiment of parts of the harrow, FIGURE 6 is a section on the line VI—VI of FIGURE 5, FIGURE 7 is a view similar to FIGURE 5 showing a further alternative embodiment of parts of the harrow, and FIGURE 8 is a section on the line VII—VII of FIGURE 7.

Referring to FIGURE 1 of the drawings, the harrow comprises three substantially identical frames 1, 2 and 3 of parallelogram shape when seen in plan view. The leading edge of each of the frames 1 to 3 is releasably by two chains 8. The beam 7 extends transversely of the the opposite ends of the rearmost edge of the frame 2 are connected to the adjacent corners of the frames 1 and 3 by two chains 8. The beam 7 extends transversely of the intended direction of travel of the harrow and has a shallow V-shaped member 9 attached to it in such a way that the point of the V projects forwardly of the harrow. A fastening link 10A is located at the point of the V and a resilient connection 10, provided at each end with hooks, connects the link 10A with the mounting beam 11 of a tractor 12 which is adapted to move the harrow over the ground. Each of the frames 1 to 3 comprises six longitudinal strips 4 and six transverse strips 5 arranged in the form of a lattice with the strips 4 uppermost and with a tine mounted at each of the thirty-six positions at which a strip 4 meets a strip 5. The strips 4 and 5 may be made from spring steel and are secured to each other in such a way that no substantial pivotal movement can take place between them in horizontal directions.

FIGURES 2, 3 and 4 show a tine and the means by which it is coupled to the strips 4 and 5. The tine has a ground-working portion 39, the portion 39 being integral with a substantially horizontal straight portion 41 which is connected by a bend to a further substantially horizontal straight portion 42 which, in turn, is connected by a still further bend to another substantially straight portion 43 whose other end is integral with a vertical portion 44 which comprises the resilient element. The portions 41 and 42 are substantially parallel and extend transversely to the direction of travel of the harrow, while the portion 43 is inclined at approximately 45° to the direction of travel of the harrow. The uppermost free end of the vertical portion 44 is bent over through 90° to form a short horizontal portion 45. The tine is connected to the strips 4 and 5 by means of a fastening member generally indicated by the reference numeral 40. The fastening member 40 has two separate segments 40B and 40C between which a vertical hole 46 is defined, the hole 46 receiving the vertical portion 44 of the tine. The short horizontal portion 45 is received in a groove 47 formed in the two segments of the fastening member 40 and is prevented from moving by means of a washer 50 having a recess 51 corresponding to the recess 47 and a nut 49A which is received upon the screw-threaded upper end 49 of the fastening member 40, the nut 49A serving also to secure the segments 40B and 40C to one another. The lower end of the fastening member 40 is in the form of an elongated head 48, the elongation being such that the vertical portion 44 of the tine is supported by the walls of the hole 46 throughout the greater part of its length.

In the arrangement shown in FIGURES 2 to 4, the tine is adapted to turn about the vertical axis 40A of the fastening member 40 by torsional deformation of the portion 44. The ground-working portion 39 and the vertical axis 40A are spaced apart from one another in a vertical plane extending in the intended direction of travel of the harrow, the said vertical plane also containing the mutually engaging faces of the segments 40B and 40C and the center line of the short horizontal portion 45.

FIGURES 5 and 6 show a further embodiment of a tine and the means by which it is connected to one of the frames of a harrow. In this case, the transverse strips 5 are replaced by beams 5A of V-shaped cross-section, the two limbs of the V being inclined to one another at an angle of less than 90°. One limb of the V of each beam 5A is substantially horizontally disposed while the other limb is inclined downwardly and forwardly with respect to the intended direction of travel of the harrow. The tine shown in the drawings is made of spring steel wire and includes a ground-working portion 52 of similar construction and disposition to the ground-working portions previously described. The upper end of the portion 52 curves through an angle of more than 90° and is integral with a substantially straight horizontal portion 54 extending generally in the intended direction of travel of the harrow. The other end of the portion 54 is turned through a similar bend of more than 90° to form a portion 55 which forms a resilient element and extends substantially parallel to the portion 52. The upper end of the portion 55 has a horizontal bent-over end 56 which extends parallel to the portion 54.

The tine is secured to a junction between one of the beams 5A and one of the strips 4 by means of a fastening member 53. The fastening member 53 is of similar cross-section to the beams 5A and is clamped to one of these beams and to one of the strips 4 by means of a bolt 61 which passes through aligned holes in the members just mentioned. The portion 55 is disposed in a hole formed by a groove 58 on one face of the semi-cylindrical downwardly inclined limb 57 of the fastening member 53 and the opposed face of the corresponding limb of the beam 5A. The bent-over end 56 is received in a similar hole afforded by a groove 60 in the horizontal limb 59 of the fastening member 53, this limb being clamped against the lower face of the corresponding limb of the beam 5A. The relative dimensions of the portions 55 and the groove 58 are such that the portion 55 is turnable in the groove 58. However, since the end 56 is retained in the groove 60, the portion 55 can only turn about its longitudinal axis 62 by torsional deformation. The ground-working portion 52 is spaced from the axis 62 by a distance approximately equal to three-quarters of the length of the portion 52.

FIGURES 7 and 8 show a further embodiment of a tine and of the means by which it is secured to one of the frames 1 to 3. In this case, the lateral strips 5 are replaced by beams 5B of V-shaped cross-section, the two limbs of the V being inclined to one another at an angle of more than 90°. One limb of each beam 5B is substantially horizontally disposed while the other limb is inclined downwardly and rearwardly with respect to the intended direction of travel of the harrow. The spring steel wire tine has a ground-working portion 63 of similar construction and disposition to the ground-working portions previously described, the upper end of the portion 63 being integral with connecting portion 64 comprises by a short straight horizontal portion 66, a vertically disposed 180° bend, a longer straight horizontal portion 76, an upwardly inclined straight portion 68 and a horizontal bent-over end 69. The portions 66 and 67 and the end 69 extend in the general direction of travel of the harrow. The tine is connected to the junction between a beam 5B and a strip 4 by means of a fastening member 65 which is secured to the parts just mentioned by a bolt 74 which passes through aligned holes therein. The fastening member 65 is of generally similar cross-section to the beam 5B and has a horizontal limb 73 and a limb 71 inclined to the vertical at the same angle as one of the limbs of the beam 5B. The portion 68 is received in a hole formed by a groove 70 in the limb 71 and the opposed face of the corresponding limb of the beam 5B and the bent-over end 69 is received in a similar groove 72 in the horizontal limb 73, the groove 72 being closed by the lowermost face of the horizontal limb of the beam 5B. The portion 68 and groove 70 are so dimensioned that the portion 68 can turn in the groove 70. However, since the end 69 is retained in the groove 72, the portion 68 can only turn about its longitudinal axis 76 by torsional deformation. Thus the portion 68 forms a resilient element in the tine. The longitudinal axis 76 is, of course, inclined to the vertical by the same angle as the lowermost limbs of the beam 5B and fastening member 65, respectively.

When the harrow is equipped with tines of the kind shown in FIGURES 2 to 4, each ground-working portion 39 is turnable about the corresponding axis 40A by torsional deformation of the corresponding portion 44 and also about horizontal axes by torsional deformation of the portions 41 to 43. The arrangement is, of course, such that each portion 49 tends to return to a position in which neither it nor any other portion of the tine is torsionally deformed.

In the two arrangements shown in FIGURES 5 to 8, the ground-working portions 52 and 63, respectively, are turnable about axes which are inclined to the vertical, the axis 62 (FIGURE 5) being downwardly and forwardly inclined with respect to the direction of travel while the axis 76 (FIGURE 7) is downwardly and rearwardly inclined with respect to the direction of travel. The inclination of these axes to the vertical offers the advantage that, when the ground-working portion 52 or 63 meets an obstacle in the ground, the torsional deformation of the portion 55 or 68 which occurs allows the portion 52 or 63 to move in a vertical direction as well as in a horizontal direction.

The portion 54 (FIGURE 5) and the portion 64 (FIGURE 7) are each located in substantially the same vertical plane extending in the direction of travel of the harrow as that which contains the corresponding ground-working portion 52 or 63. Thus, the portions just mentioned are not capable of turning torsionally about horizontal axes extending transversely of the direction of travel of the harrow. The ground-working portions 52 and 63 will therefore have a somewhat greater resistance to forces acting in directions parallel to the direction of travel since they are movable in a vertical plane extending in the direction of travel only by resilient deformation of the portions 54 and 64, respectively. The portions 54 and 66, 67 can, however, be torsionally deformed by forces acting on the ground-working portions 52 and 63 in directions transverse to the direction of travel. In the arrangement shown in FIGURES 7 and 8, the axis 76 of the portion 68 intersects the ground-working portion 63 at a position close to the lowermost end of the latter. This arrangement ensures that the portion 63 can only deflect through small distances relative to the corresponding frame by turning about the axis 76. Thus, the tine can be of somewhat more rigid construction than in the instance of the tine shown in FIGURES 2–4, thus allowing the harrow to be used successfully with heavier or more compact soils.

In all of the embodiments of the invention, the portions forming resilient elements, namely 44, 55 and 68, are joined to their respective connecting portions at points forwardly of the ground-working portions. The resilient element and connecting portion of each tine is made of a single piece of spring steel wire of circular cross-section.

The slight forward inclination of the ground-working portion of each tine relative to the direction of travel which is exhibited in the unloaded state of the tines is necessary to ensure that these portions occupy the correct positions for working the ground efficiently during operation of the harrow.

I claim:

1. A harrow comprising a frame and a plurality of tines, at least one tine having a ground working portion, said ground working portion being connected to a resilient element by means of a connecting portion, at least part of said connecting portion extending substantially horizontally and generally in the intended direction of travel of the harrow, said resilient element extending substantially vertically and being connected to the frame of said harrow, said connecting portion and said ground working portion being both generally straight throughout the greater part of their lengths and being disposed substantially perpendicular to each other, said ground working portion, said connecting portion and said resilient element being formed from one piece of spring-steel, said ground working portion during operation being located to the rear of the junction between said connecting portion and said resilient element with respect to the intended direction of travel of the harrow, at least one resilient loop being provided between said connecting portion and said ground working portion, said resilient loop lying in a substantially horizontal plane.

2. A harrow as claimed in claim 1, wherein said resilient element terminates in a substantially horizontal bent-over end which is interconnected with said frame.

3. A harrow comprising a frame and a plurality of tines, at least one tine having a ground working portion, said ground working portion being connected to a resilient element by means of a connecting portion, at least part of a said connecting portion extending generally in the intended direction of travel of the harrow, said connecting portion and said ground working portion being both generally straight throughout the greater part of their lengths and being disposed substantially perpendicular to each other, said resilient element extending substantially vertically and being connected to the frame of said harrow by means of a substantially horizontal bent-over part, said bent-over part, said ground working portion, said connecting portion and said resilient element being formed from one piece of spring-steel with a circular cross section, said working portion during operation being located to the rear of the junction between said connecting portion and said resilient element with respect to the intended direction of travel of the harrow, at least part of said bent-over part being located in a channeled fastening member secured to the frame, whereby said resilient element is turnable about a nonhorizontal axis by torsion deformation.

4. A harrow as claimed in claim 3, wherein at least one resilient loop is provided between said connecting portion and said ground working portion, said resilient loop lying in a substantially horizontal plane.

5. A harrow as claimed in claim 3, wherein said fastening member is substantially L-shaped.

References Cited

UNITED STATES PATENTS

| | | | |
|---|---|---|---|
| 294,292 | 2/1884 | Viele | 172—713 X |
| 413,274 | 10/1889 | Brown | 172—643 |
| 517,227 | 3/1894 | Maine | 172—389 |
| 718,187 | 1/1903 | Baker | 172—390 |
| 839,310 | 12/1906 | Nelson | 172—643 |
| 965,961 | 8/1910 | Swanson | 172—643 X |
| 1,112,045 | 9/1914 | Young | 172—707 |
| 1,570,782 | 1/1926 | Scheving | 172—707 X |
| 2,227,774 | 1/1941 | Ahrens | 172—142 X |

ABRAHAM G. STONE, *Primary Examiner.*

J. R. OAKS, *Assistant Examiner.*